(12) United States Patent
Jung

(10) Patent No.: US 7,920,574 B2
(45) Date of Patent: Apr. 5, 2011

(54) METHOD FOR TRANSMITTING PACKET FROM CORRESPONDENT NODE TO MOBILE NODE

(75) Inventor: You La Jung, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 872 days.

(21) Appl. No.: 11/672,615

(22) Filed: Feb. 8, 2007

(65) Prior Publication Data

US 2007/0183431 A1  Aug. 9, 2007

(30) Foreign Application Priority Data

Feb. 8, 2006  (KR) .................. 10-2006-0012070

(51) Int. Cl.
*H04L 12/56* (2006.01)
(52) U.S. Cl. ................... 370/395.52; 370/352
(58) Field of Classification Search ............. 455/445, 455/432.1, 440; 370/328, 389, 392, 349, 370/338, 395.3, 395.31, 395.2, 409, 395.52
See application file for complete search history.

(56) References Cited

U.S. PATENT DOCUMENTS

| 7,174,166 B2* | 2/2007 | Song et al. ............... 455/436 |
| 2002/0021680 A1* | 2/2002 | Chen ..................... 370/331 |
| 2003/0088765 A1* | 5/2003 | Eschbach et al. ........... 713/150 |
| 2006/0187896 A1* | 8/2006 | Jung ..................... 370/349 |

* cited by examiner

*Primary Examiner* — Dwayne D Bost
*Assistant Examiner* — Myron Wyche
(74) *Attorney, Agent, or Firm* — H.C. Park & Associates, PLC

(57) ABSTRACT

A method is disclosed for transmitting a packet from a correspondent node to a mobile node when the mobile node moves from a home network to an external network equivalent to the correspondent node's local network. The method may include securing a Care Of Address (COA) for the mobile node. The COA may be used to forward a packet intended for the mobile node by a home agent in the home network. The method may also include obtaining the COA at the home agent to update binding information on the mobile node, transmitting the updated binding information to a correspondent node, and setting a target IP address for the packet transmitted by the correspondent node. The target IP address may be the COA of the mobile node when the correspondent node's local network is the same as the external network where the mobile node is located.

13 Claims, 2 Drawing Sheets

[ PRIOR ART ]

METHOD FOR TRANSMITTING PACKET FROM CORRESPONDENT NODE TO MOBILE NODE

CROSS REFERENCE TO RELATED APPLICATION

This application claims priority from and the benefit of Korean Patent Application No. 10-2006-0012070, filed on Feb. 8, 2006, which is hereby incorporated by reference for all purposes as if fully set forth herein.

BACKGROUND OF THE INVENTION

1. Field of the Invention

The present invention generally relates to a method for transmitting a packet from a correspondent node to a mobile node, and more specifically, to a method for transmitting a packet from a correspondent node to a mobile node located in the same network as the correspondent node but included in a different home network than the correspondent node.

2. Discussion of the Background

A mobile internet protocol (IP) theory has been introduced to secure mobility of mobile nodes such as a notebook computer or a mobile phone that use IP to transmit data as packets between nodes. According to mobile IP theory, when different local networks are connected together through the Internet, a mobile node can move from a home network, defined as a local network to which the mobile node belongs, into an external network, defined as a local network other than the home network. When in the home network, the mobile node has a home IP address. However, when the mobile node moves into an external network, the mobile node is assigned a new IP address different than the home IP address to receive packets while in the external network.

According to the conventional method of transmitting a packet to the mobile node, the mobile node first broadcasts an agent solicitation message to locate an agent in the network where the mobile node is located. If the mobile node is located in an external network, an external agent in the external network transmits an agent advertisement message in response to the agent solicitation message. The mobile node then verifies whether the mobile node is located in the home network or whether the mobile node has moved into an external network. This step is performed by examining the external agent's IP address information included in the agent advertisement message. Thereafter, if the mobile node is located in an external network, the mobile node registers a Care of Address (COA) with a home agent in the home network to which the mobile node belongs. If the home agent receives a packet intended for the mobile node, the home agent forwards the packet to the COA in the external network. The COA is a new IP address where the mobile node receives a packet in the external network, and is substituted for the mobile node's home IP address when it has roamed into an external network. As a result, the home agent associates the home IP address with the COA of the mobile node as binding information if the mobile node moves into the external network. Therefore, when a correspondent node transmits a packet intended for the mobile node, the home agent receives the packet, detects the COA using the binding information, and routes the packet to the mobile node located in the external network.

However, according to the conventional mobile IP theory, even when the mobile node moves into an external network that is the same network as the correspondent node's local network, the mobile node's packet passes through the Internet twice. Thus, this conventional mobile IP theory is inefficient when the mobile node moves into the same local network as the correspondent node.

FIG. 1 is a diagram illustrating a conventional mobile IP theory. When a mobile node 40 moves out of a home network 300 and into an external network 100 and is treated as a mobile node 40', the mobile node 40' searches for a router to serve as an external agent 20. If the external agent 20 transmits a registration solicitation message from a mobile node 40' to a home agent 30, the home agent 30 secures the connection to the mobile node 40'. Then, a correspondent node 10 transmits a packet to the home agent 30 through an Internet 200, and the home agent 30 transmits the packet to the external agent 20 through the Internet 200 based on secured binding information, such as a Foreign Agent Care of Address (FACOA). The FACOA is an IP address of the external agent 20, and when FACOA is used, all mobile nodes 40' in an external network 100 that have home networks 300 other than the external network 100 use the FACOA as their COA.

Thus, the conventional mobile IP theory does not revise the method for transmitting a packet with the correspondent node 10 and the mobile node 40' may be located in the same local network due to movement of the mobile node 40. As a result, when a packet is transmitted from the correspondent node 10 to the mobile node 40' arranged in the same local network, the packet is ineffectively passed through the Internet 200, which is called "double crossing." Although FIG. 1 shows that the mobile node 40' receives the FACOA in the external network through the external agent 20, the double crossing is also generated when the mobile node 40' receives a CO-LOCATED COA. When CO-LOCATED COA is used, each mobile node 40' in an external network 100 that has a home network 300 other than the external network 100 receives a unique COA in that external network 100. Management of IP addresses to be assigned as CO-LOCATED COA in this system is usually performed by a Dynamic Host Configuration Protocol (DHCP) server, which may maintain a list of available IP addresses.

In the conventional system, when a home agent 30 receives a first packet destined for the mobile node 40', the home agent 30 transmits updated binding information on the mobile node 40' to the correspondent node 10. The correspondent node 10 may generate and administer the binding information on the mobile node 40'. Therefore, a method has been developed for transmitting a second packet to a mobile node 40' in the same local network with the correspondent node 10 that does not pass through the Internet 200 based on the updated binding information transmitted in the first packet.

However, even with this method, the first packet is passed through the Internet 200 twice, or double crossed, and transmitted to the mobile node 40'. The correspondent node 10 generates and administers the binding information on the mobile node 40' based on the updated binding information transmitted in the first packet. Therefore, there is a need for a method whereby even the first packet does not need to pass through the Internet 200.

SUMMARY OF THE INVENTION

This invention provides a method for transmitting a packet from a correspondent node to a mobile node via a router in a local network, not through the Internet, when the mobile node and a correspondent node are located in the same local network.

Additional features of the invention will be set forth in the description which follows, and in part will be apparent from the description, or may be learned by practice of the invention.

The present invention discloses a method for transmitting a packet from a correspondent node to a mobile node where the mobile node moves from a home network to an external network connected to the home network through the Internet. The method includes securing COA used to receive a packet while in the external network from a home agent in the home network, receiving the COA at the home agent to update binding information on the mobile node; transmitting the updated binding information to a correspondent node, comparing network information of the COA with network information of the local network to which the correspondent node belongs, and setting a target IP address of the packet to be transmitted from the correspondent node to the mobile node as the COA.

The present invention also discloses a method for transmitting a packet from a correspondent node positioned in a local network to a mobile node belonging to a home network but positioned in the local network, where the home network is connected to the local network through the Internet. The method includes transmitting an Address Resolution Protocol (ARP) solicitation message, receiving updated binding information comprising a Care Of Address (COA) for the mobile node, comparing network information of the COA with network information of the local network, setting a target Internet Protocol (IP) address of a packet to be transmitted to the mobile node as the COA, and transmitting a first packet to the mobile node at the target IP address.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
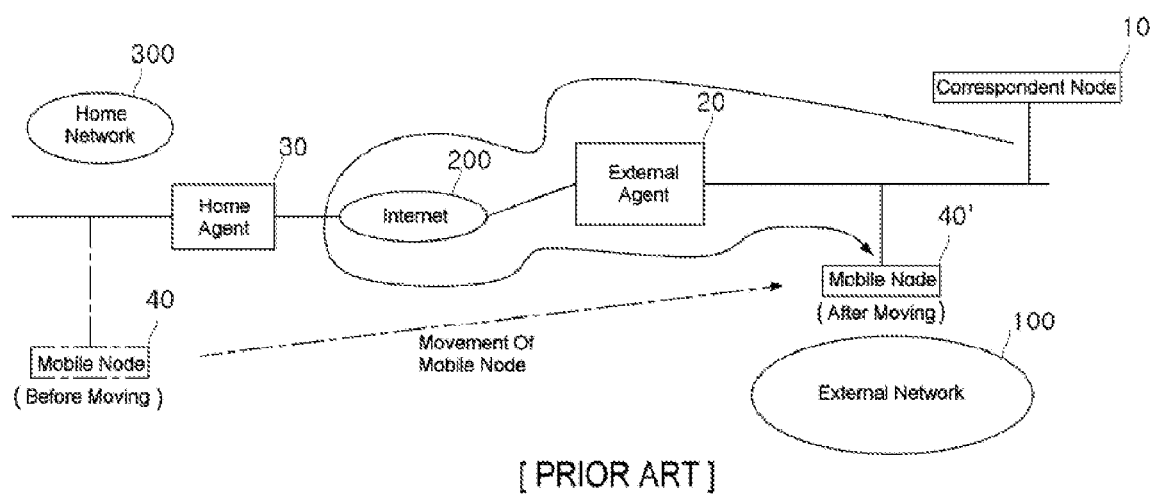
FIG. 1 is a diagram illustrating a conventional mobile IP theory.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element or when two elements are "connected together," one element can be directly connected to the other element, or intervening elements or layers may be present.

In an exemplary embodiment, a method is disclosed for transmitting a packet from a correspondent node to a mobile node when the mobile node moves from a home network. The external network is connected to the home network through the Internet. The method may include securing a COA for the mobile node. The COA may be used to forward a packet intended for the mobile node by a home agent charged with packet routing in the home network. The method may also include obtaining the COA at the home agent to update binding information on the mobile node, transmitting the updated binding information to a correspondent node, and setting a target IP address for the packet transmitted by the correspondent node. The target IP address may be the COA of the mobile node when the correspondent node's local network is the same as the external network in which the mobile node is arranged.

A correspondent node 10 determines a physical address of a home agent 30 before the correspondent node 10 transmits a packet. The correspondent node 10 broadcasts an Address Resolution Protocol (ARP) solicitation message, and the home agent 30 responds to the ARP solicitation message by broadcasting an ARP response message. When the ARP response message is received by the correspondent node 10, the correspondent node 10 transmits the physical address of the home agent 30 while the home agent 30 replies with information of the secured COA to the correspondent node 10. Address Resolution Protocol (ARP) generally refers to a method for determining a node's physical address, such as its Media Access Control (MAC) address, when only its IP address is known.

When the correspondent node 10 secures the COA of the mobile node 40' in the external network as well as the binding information, the correspondent node 10 compares prefix information of its IP address with that of the COA to determine whether the external agent 20 for routing a packet to the mobile node 40' is located in the same local network as the correspondent node 10. Thus, unlike in the conventional packet transmission method, it is possible to transmit a packet initially with consideration for the physical location of the mobile node 40'.

The correspondent node 10 does not administer the binding information on the mobile node 40' because the correspondent node 10 sets a target IP address of the packet as COA when the prefix information indicates that the correspondent node 10 and the mobile node 40' are both arranged in the same network.

An exemplary embodiment of the present invention can be applied when the COA is either FACOA or CO-LOCATED COA because the FACOA and the CO-LOCATED COA as COA have prefix information that reveal the identity of the network.

Before securing the COA, the method may further include broadcasting an agent solicitation message in the external network 100 from the mobile node 40', and transmitting an agent advertisement message from an external agent 20 to the mobile node 40' in response to the mobile node 40' agent solicitation message. By doing so, the mobile node 40' may determine that it is located outside the home network 300.

The agent advertisement message may include an R field, which may be a COA type determining field, having a value equal to zero or one. When the COA type determining field has a bit value of 1, representing a value of "TRUE," the COA type may be FACOA. When the COA type determining field has a bit value of 0, representing a value of "FALSE," the COA type may be CO-LOCATED COA.

The method may further include transmitting a packet to the mobile node 40' through the home agent 30 when the correspondent node 10 has a local network different than the external network 100, when the correspondent node's 10 compares prefix information of its own IP address with that of the COA.

When the mobile node 40' is located in a different network than the correspondent node 10, the above-described double crossing does not occur so that the method for transmitting a packet between these two nodes may occur according to conventional mobile IP theory.

The step of transmitting the updated binding information is performed after the correspondent node 10 requests information on the physical address of the home agent 30 to secure binding information of the home agent 30 before the correspondent node 10 transmits a packet.

In the step of transmitting the updated binding information, the binding information transmitted to the correspondent node 10 by the home agent 30 includes the COA and the physical address of the home agent 30.

That is, when the home agent 30 receives the ARP solicitation message from the correspondent node 10, the ARP response message includes the physical address field and the COA field, which are both transmitted to the correspondent node 10 to prevent double crossing. The physical address of the home agent 30 may be a MAC address of the home agent 30.

Figure 2:
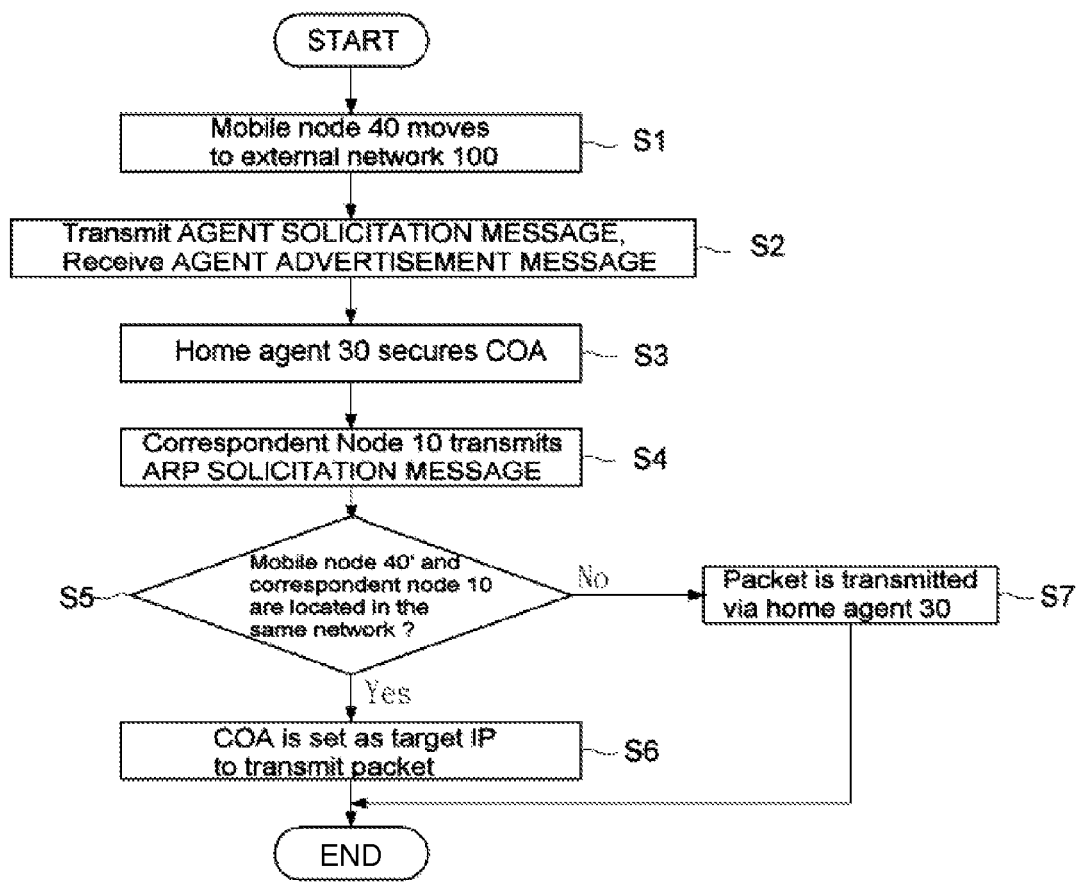
FIG. 2 is a flow chart illustrating a method for transmitting a packet from a correspondent node to a mobile node according to an exemplary embodiment of the present invention.

FIG. 2 is a flow chart illustrating a method for transmitting a packet from a correspondent node to a mobile node according to an exemplary embodiment of the present invention. The mobile node 40 and mobile node 40' include a mobile terminal that uses IP for data transmission and reception.

In step S1, a mobile node 40 moves from a home network 300, to which the mobile node 40 belongs, into an external network 100. If located in the external network 100, the mobile node 40 will be referred to as mobile node 40'.

In step S2, mobile node 40' broadcasts an agent solicitation message to secure an agent for routing a packet after movement. Where the mobile node 40' is located in the external network 100, one router from among the routers that receive the agent solicitation message may be designated as the external agent 20 for routing a packet to the mobile node 40'. The designated external agent 20 transmits an agent advertisement message to the mobile node 40'.

Since the agent advertisement message transmitted from the external agent 20 includes IP address information for the external agent 20, the mobile node 40' detects whether the mobile node 40' has moved into a local network other than home network 300.

When the mobile node 40' moves into the external network 100, the mobile node 40' transmits a registration solicitation message to the external agent 20. The home agent 30 secures binding information of the mobile node 40's COA, which may be FACOA or CO-LOCATED COA, to update the binding information on the mobile node 40' in step S3.

In the agent advertisement message received by the mobile node 40' in step S2, there may be an R bit having a value equal to "TRUE" or "FALSE." If the R bit has a value "TRUE," the home agent 30 may secure binding information of the FACOA to update binding information of the mobile node 40' in step S3. However, if the R bit has a value "FALSE," the mobile node 40' may secure binding information of a CO-LOCATED COA to update binding information of the mobile node 40' in step S3.

In step S4, the correspondent node 10 broadcasts an ARP solicitation message for securing physical address information based on the COA of the mobile node 40'. The home agent 30 adds a field of the physical address information, such as a MAC address, as well as a field of IP address information, such as FACOA or CO-LOCATED COA, to the ARP response message. The home agent 30 then transmits this physical address information and IP address information to the correspondent node 10.

In step S5, the correspondent node 10 compares its prefix information with prefix information included in the IP address information, and determines whether the mobile node 40' is included in the external network 100 corresponding to the local network of the correspondent node 10.

If the mobile node 40' is included in the external network 100 corresponding to the local network of the correspondent node 10, i.e. in case of "Yes" in step S5, the correspondent node 10 sets a target IP address in an IP header of a packet to be transmitted to the mobile node 40' in step S6. When the COA type is FACOA, the target IP address is the FACOA of the external agent 20. This packet from the correspondent node 10 is not passed through the Internet 200 and the home agent 30 from its initial transmission, but is transmitted to the mobile node 40' through the external agent 20. When the COA type is CO-LOCATED COA, the target IP address of the packet transmitted from the correspondent node 10 is set as CO-LOCATED COA. Thus, the packet from the correspondent node 10 is not passed through the home agent 30 or the Internet 200, but is transmitted to the mobile node 40'.

If the mobile node 40' is not included in the external network 100 corresponding to the local network of the correspondent node 10, i.e. in case of "No" in step S5, the packet from the correspondent node 10 is transmitted to the mobile node 40' via the home agent 30 in step S7.

As described above, according to an exemplary embodiment of the present invention, when a mobile node and a correspondent node are located in the same network, a packet is not passed through the Internet, but is transmitted to the mobile node via a router in the corresponding network to prevent double crossing. Unlike the prior art, the correspondent node does not form and administer binding information on the mobile node.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for transmitting a packet from a correspondent node to a mobile node where the mobile node moves from a home network to an external network connected to the home network through the Internet, the method comprising:

obtaining a Care Of Address (COA) used to receive a packet while in the external network from a home agent in the home network;

receiving the COA at the home agent to update binding information on the mobile node;

transmitting the updated binding information to a correspondent node;

comparing network information of the COA with network information of the local network to which the correspondent node belongs to determine whether the external network is the same network as the local network; and setting a target Internet Protocol (IP) address by the correspondent node and transmitting the packet from the correspondent node to the mobile node through a router when the external network is the same network as the local network.

2. The method of claim 1, further comprising:
transmitting an agent solicitation message from the mobile node; and
transmitting an agent advertisement message to the mobile node from an external agent of the external network.

3. The method of claim 2, wherein the agent advertisement message includes a COA type determining field.

4. The method of claim 3, wherein the COA is a Foreign Agent Care Of Address (FACOA) equivalent to an IP address of the external agent when the COA type determining field has a bit value of one.

5. The method of claim 3, wherein the COA is a CO-LOCATED COA equivalent to an IP address unique to the mobile node in external network when the COA type determining field has a bit value of zero.

6. The method of claim 1, further comprising:
transmitting a packet to the mobile node through the home agent when the local network to which the correspondent node belongs is different than the external network.

7. The method of claim 1, wherein the network information is prefix information.

8. The method of claim 1, further comprising:
requesting information on a physical address of the home agent by the correspondent node.

9. The method of claim 8, wherein the updated binding information comprises a COA field and a physical address field of the home agent.

10. The method of claim 8, wherein the physical address of the home agent is a Media Access Control (MAC) address.

11. A method for transmitting a packet from a correspondent node positioned in a local network to a mobile node belonging to a home network but positioned in the local network, where the home network is connected to the local network through the Internet, the method comprising:
transmitting an Address Resolution Protocol (ARP) solicitation message;
receiving updated binding information comprising a Care Of Address (COA) for the mobile node;
comparing network information of the COA with network information of the local network to determine whether the correspondent node and the mobile node are both in the local network; and
setting a target Internet Protocol (IP) address by the correspondent node and transmitting a first packet from the correspondent node to the mobile node at the target IP address through a router when the correspondent node and the mobile node are both in the local network.

12. The method of claim 11, wherein the COA is a CO-LOCATED COA corresponding to an IP address assigned to the mobile node.

13. The method of claim 11, wherein the COA is a Foreign Agent COA (FACOA) corresponding to an IP address of a router in the local network.

* * * * *